US007888578B2

(12) United States Patent
Guo et al.

(10) Patent No.: US 7,888,578 B2
(45) Date of Patent: Feb. 15, 2011

(54) ELECTRONIC MUSICAL SCORE DISPLAY DEVICE

(75) Inventors: Yan-Liang Guo, Taipei (TW); Ching-Hui Chen, Linkou Township, Taipei County (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 298 days.

(21) Appl. No.: 12/153,285

(22) Filed: May 16, 2008

(65) Prior Publication Data

US 2009/0217803 A1 Sep. 3, 2009

(30) Foreign Application Priority Data

Feb. 29, 2008 (CN) ........................ 2008 1 0026576

(51) Int. Cl.
*G09B 15/02* (2006.01)

(52) U.S. Cl. ..................... 84/609; 84/471 R; 84/477 R; 84/601; 84/644

(58) Field of Classification Search .................... 84/609
See application file for complete search history.

(56) References Cited

U.S. PATENT DOCUMENTS

| | | | | |
|---|---|---|---|---|
| 3,930,621 | A * | 1/1976 | Wood | 33/430 |
| 4,141,273 | A * | 2/1979 | Austin | 84/484 |
| 5,400,687 | A * | 3/1995 | Ishii | 84/477 R |
| 5,540,007 | A * | 7/1996 | Kulp et al. | 40/610 |
| 5,760,323 | A * | 6/1998 | Romero et al. | 84/470 R |
| 6,483,019 | B1 * | 11/2002 | Hamilton | 84/477 R |
| 7,041,890 | B1 * | 5/2006 | Sutton | 84/477 R |
| 7,119,266 | B1 * | 10/2006 | Bittner et al. | 84/477 R |
| 7,145,068 | B2 * | 12/2006 | Mizuno | 84/477 R |
| 2001/0037719 | A1 * | 11/2001 | Gardner et al. | 84/478 |
| 2006/0017659 | A1 * | 1/2006 | Ogawa et al. | 345/30 |
| 2007/0002440 | A1 * | 1/2007 | Miyagawa et al. | 359/461 |
| 2008/0060507 | A1 * | 3/2008 | Welchering | 84/645 |

FOREIGN PATENT DOCUMENTS

| | | |
|---|---|---|
| TW | I229845 | 3/2005 |

* cited by examiner

*Primary Examiner*—Elvin G Enad
*Assistant Examiner*—Christopher Uhlir
(74) *Attorney, Agent, or Firm*—Rosenberg, Klein & Lee

(57) ABSTRACT

An electronic musical score display device comprises an electronic display panel displaying at least one page of musical score data; a manipulator that will transmit a page turn signal wirelessly, generated from a pressure contact such as the pressing of a foot; and a microprocessor that controls the divided pages of musical score data being shown on the electronic display panel, which after receiving the page turn signal will perform a page turn action. Therefore, a performer is not required to manually turn pages on the electronic musical score display device by hand, so the performance is not interrupted due to page turning, thereby increase the performance quality.

7 Claims, 3 Drawing Sheets

ELECTRONIC MUSICAL SCORE DISPLAY DEVICE

BACKGROUND OF THE INVENTION

1. Field of the Invention

This invention relates to an electronic musical score display device and particularly to an electronic musical score display device where pages of a musical score do not need to be turned by hand.

2. Description of Related Art

When playing an instrument, a music performer usually will set a musical score for convenient page turning which aids musical score reading. However, when the performer needs to perform with both hands, the action of turning the pages of musical score will not only interrupt the performer, but also has the additional possibility that the performer will overturn a music stand or turn to a wrong page, thereby resulting the performer with inconvenience and inferior performance. The currently popular and available electronic musical score display devices likewise must be manually pressed by the performer for page turning, which share the same inconvenience and limitation as described above.

In order to improve upon the limitation described above, a prior art patent "ELECTRONIC MUSICAL SCORE DEVICE" was disclosed in Republic of China (R.O.C.) Publication No. 1229845. In the prior art patent, notes may be identified to turn the pages of musical score; namely, a microprocessor receives the notes identified by an identification unit and compares them with musical score data in a storage unit to determine whether the notes while being given by the performer are corresponding to a location where notes in the musical score data exist; if the notes are located at several count-down musical score data on the page shown on a display unit, the microprocessor control the display unit to display the next page of musical score in the musical score data. However during the music performance, the identification unit is easily interfered by the sound made by an instrument, so the accuracy of notes identification is lower than desirable, so that a command for page turning is not always consistent, and page turning cannot always be smoothly achieved.

Further, the prior art electronic musical score display device generally comprises a larger electronic display panel, such as a LCD panel, which is not easily portable.

Consequently, because of the technical limitations described above, the applicant strives via real world experience and academic research to develop the present invention, which can effectively improve the limitations described above.

SUMMARY OF THE INVENTION

The present invention is mainly to provide an electronic musical score display device that does not need to be manually operated for page turning by the performer, and does not need to be operated for page turning by hand.

The electronic musical score display device further include the characteristic that the device is not easily interfered when being operated.

Finally the electronic musical score display device will also possess the advantage of being portable.

The electronic musical score display device according to the present invention comprises an electronic display panel displaying at least one page of musical score data; a manipulator that will transmit a page turn signal wirelessly, generated from a pressure contact (specifically, the pressure contact is designed for the pressing of a foot); and a microprocessor that controls the divided pages of musical score data being shown on the electronic display panel, which after receiving the page turn signal will perform a page turn action.

Furthermore, the electronic display panel is an electronic paper (such as rollable display of e-ink technology) along with a cylindrical storage unit, which the electronic paper is rolled and collected within. Preferably, a wireless transmission module is further provided in the cylindrical storage unit to receive the page turn signal and to transmit the musical score data. A memory is also provided in the cylindrical storage unit to store the musical score data.

Next, the manipulator has the shape of a half-tube and, when being collected, is set around the outer surface of the cylindrical storage unit, wherein a cylindrical fringe of the cylindrical storage unit is formed with a supporting cushion. The supporting cushion is made of rubber to prevent the manipulator from slipping when a user applies the pressure contact (such as when stepping on the manipulator with a foot).

Optionally, wherein the electronic display panel is the electronic paper provided with the cylindrical storage unit. One end of the electronic paper may be fixed inside the cylindrical storage unit and the other end, while during device operation (operating mode), is unfolded outside the cylindrical storage unit thereby the electronic display panel is formed, and the electronic display panel is rolled in the cylindrical storage unit for collection (storage mode).

Preferably, the shape of manipulator is compatible to that of cylindrical storage unit, and at the time of collection, the manipulator is set around the outer surface of cylindrical storage unit.

Preferably, the manipulator comprises a sensor device, and when a foot steps on the sensor device, the page turn signal is generated. Within a preset time frame, the sensor device may be continuously pressed several times in a predetermined format, thus allowing different page turn signals to be generated. Preferably, when the sensor device is pressed one time in three seconds, an operating signal for turning a page backward is generated; when the sensor device is rapidly pressed two times in three seconds, an operating signal for turning a page forward is generated.

Preferably, the manipulator comprises an upper layer and a lower layer. The upper layer is connected to the lower layer through a pivot. On the surface of lower layer, at least two contact switches (contact switches may be pressure sensor device that converts pressure directly to electrical pulses or simple mechanical switch that clicks by contact), a wireless transmission module, a simplified processor, and a power supply are provided, in which the contact switches are respectively arranged at left and right sides of the pivot and are triggered by pressure applied to the left end or right end side of the upper layer. Once the upper layer shift to the left or right side the pivot due to the pressure applied (similar to the action of a seesaw with the pivot as the middle anchor), the respective end of the upper layer will press the associated contact switch, which would generate a signal to the microprocessor, and the microprocessor will control the divided pages of musical score data for page turn.

In another preferable embodiment, the manipulator comprises an upper layer and a lower layer. At least one page-turn button is provided on the surface of upper layer. On the surface of lower layer, at least one contact switch, the wireless transmission module, the simplified processor, and the power supply are provided. When being pressed, the page-turn button triggers the contact switch to generate a signal to the microprocessor for turning pages. The difference between this embodiment and the previous embodiment is that the previous embodiment uses the right and left end surface of the upper layer as the respective right and left page-turn button, each end with associated contact switches (such as right and left pressure sensor) build underneath. In this embodiment, there is one clearly defined page-turn button (not using surface itself as button) and only one associated contact switch (pressure sensor) coupled underneath, so that in order to differentiate between turning page forward or turning page backward, a combination of pressure contact sequence should be applied. For example, one pressure contact in 3 seconds would generate signal for turning page backward and two rapid pressure contacts in 3 seconds would generate signal for turning page forward.

The electronic musical score display device according to this invention is provided with a manipulator that can be pressed by the performer or a second person with a foot to turn the pages, which enables the performer to easily turn the pages of a musical score to read at the time of performance. Also, because the display surface of the electronic display panel is made from electronic paper, thus the electronic display panel of the electronic musical score display device may be stored (i.e. rolled up) and thus easily portable. Furthermore, the manipulator transmits the operating signal wirelessly, so extraneous cable is not required, and the shape of the manipulator is compatible to that of cylindrical storage unit so that the manipulator may be set around the outer surface of the cylindrical storage unit, making the electronic musical score displaying device more compact and thus easy to transport and to store.

DETAILED DESCRIPTION OF THE PREFERRED EMBODIMENTS

The present invention will be described more specifically with reference to the following embodiments. It is to be noted that the following descriptions of preferred embodiments of the present invention are presented herein for purpose of illustration and description only; it is not intended to be exhaustive or to be limited by the precise form disclosed.

Figure 1:
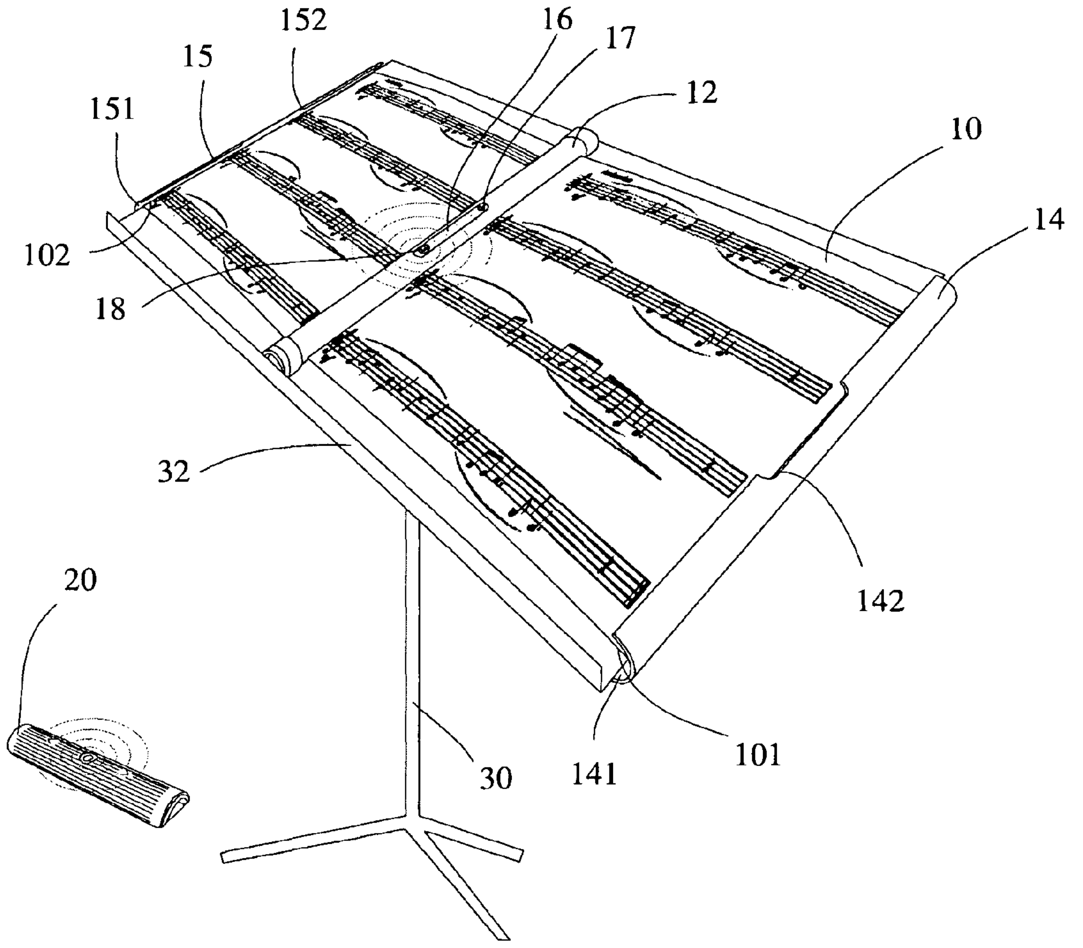
FIG. 1 is a schematic view illustrating an electronic musical score display device in a first embodiment of this invention in the condition of service (operating mode)

FIG. 1 is a schematic view illustrating an electronic musical score display device in operation, the electronic musical score display device comprising an electronic display panel 10, a manipulator 20, and a support rack 30.

In order to enable a performer to easily read an electronic musical score, the support rack 30 is provided with a support plate 32, and the electronic display panel 10 is placed on the support plate 32 under the condition of performance (operating mode). It should be noted, when the present invention device is operating (see FIG. 1 for operating mode) it is under operating mode, when it is off and put away (i.e. electronic display panel 10 rolled up) then it is under storage mode (see FIG. 3 for storage mode).

The electronic display panel 10 formed with a rectangular electronic paper comprises an cylindrical storage unit 12, two sides 101 and 102 parallel to the cylindrical storage unit 12, and fixtures provided at the two sides 101 and 102 (i.e. the fixtures in FIG. 1 is 14 and 15). When the electronic paper is unfolded, the fixtures respectively hook to the right and left sides of support plate 32 and thus the electronic display panel 10 is kept securely unfolded and fixed onto the support plate 32.

Practically, in the embodiment, the fixtures are shells 14 and 15 in the shape of a half-tube. Inner sides 141 and 151 of the shell 14 and 15 in the shape of a half-tube and is respectively fixed and connected to the sides 101 and 102 of the electronic paper. When the electronic paper is unfolded, the shells 14 and 15 in the shape of half-tube respectively hook to the right and left sides of support plate 32 and thus the electronic display panel 10 is kept securely fixed onto the support plate 32.

In order to display the electronic music score and turn pages, a microprocessor, a memory, a wireless transmission module, and a battery as electronic components are further provided in the cylindrical storage unit 12. The microprocessor controls the divided pages of musical score data for page turning (as shown on the electronic display panel 10), such that when the microprocessor receives a page turn signal, it will control the divided pages of musical score data for page turn; the memory is used to store the musical score data; the wireless transmission module is used to receive the page turn signal and to transmit the musical score data; the battery act as the power supply to the electronic display panel. A status indicating lamp is further provided in the cylindrical storage unit 12 and emits rays of light from a long transparent area 16 on the surface of cylindrical storage unit 12, in which the long transparent area 16 cylindrically stretches along the cylindrical storage unit 12. A power switch 17 is provided at one end of the long transparent area 16, and a signal receiving/transmission port 18 for the wireless transmission module is formed at the other end.

Briefly speaking, during performance, the performer may press with the foot on manipulator 20 to turn pages and to read the musical score so that the performance is not interrupted and the page turning function would not be interfered by background noise since there is no voice or sound command involved. It should be especially noted that there are several ways in which the manipulator 20 may be pressed by foot to turn the pages (i.e. one pressure contact in 3 seconds would generate signal for turning page backward and two rapid pressure contacts in 3 seconds would generate signal for turning page forward).

Figure 2:
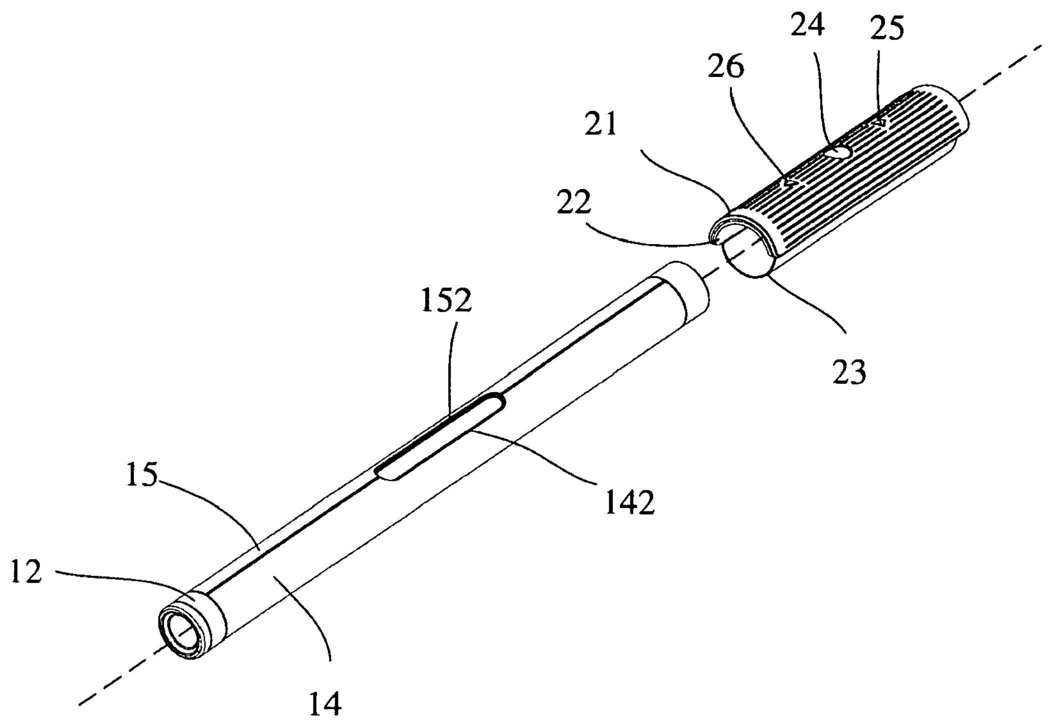
FIG. 2 is a schematic view illustrating the electronic musical score display device in the first embodiment of this invention in the condition of storage (storage mode)

Refer to FIGS. 1 and 2 for the details of manipulator 20. During operation, the manipulator 20 is placed on the floor for the performer to step on it with the foot. Practically, in the embodiment, the manipulator 20 is structured with an upper layer 21 and a lower layer 22. The upper layer 21 is provided with an operation panel mainly for the performer, on which a transparent area 24 and two page turn direction signs 25 and 26 are formed. The main components for controlling the manipulator 20 is provided on the lower layer 22, comprising a simplified processor, a wireless transmission module, a power supply, and a pressure sensor device or at least one contact switch. These main components (not shown) are provided on an upper surface of the lower layer, and placed between the upper layer 21 and the lower layer 22. The upper layer 21 is connected to the lower layer 22 through a pivot (provided between the upper layer 21 and the lower layer 22 and not shown). The contact switches are separately provided at left and right sides of the pivot on the upper surface of lower layer 22 (can also be think of as between upper layer 21 and lower layer 22) and respectively function to generate a signal for turning to a previous page or a signal for turning to a next page when one end of the upper layer 21 receives pressure contact. In other words, there is a contact switch that is located underneath the upper layer 21, so that as the upper layer 21 shift against the pivot (like a seesaw with the pivot as the support point), the end of the upper layer 21 will press one of the contact switches to generate a signal for the microprocessor, and the microprocessor which will control the divided pages of musical score data and turn pages.

Optionally, a page-turn button or more may be provided on the upper layer 21 and corresponding to a contact switch (in a 1 to 1 ratio), wherein the contact switch is provided between upper layer 21 and lower layer 22, and the page-turn button may be pressed by a foot to shift downwards (such as a mechanical switch, there would be no shifting downwards for a pressure sensor switch) and trigger the contact switch to generate a signal for the microprocessor for page turn.

Further, the contact switch may be replaced with a pressure sensor device.

Regarding the operational principle, a force is applied by the foot to the pressure sensor device causing the pressure sensing device to connect related circuits in the simplified processor with each other to generate the operation signal, or a force is applied by the foot to press the contact switch (mechanical), which connects the related circuits in the simplified processor with each other to generate the operation signal, in both cases the operation signal is transmitted by the wireless transmission module in the manipulator 20, then received by the wireless transmission module in the cylindrical storage unit 12, and then the operation signal is processed by the microprocessor to control the page turn. The wireless aspect of the present invention is made possible by the wireless communication module in the cylindrical storage unit 12 and the wireless communication module in the manipulator 20, and can be Bluetooth, IR, or RF.

Within a preset time, if the pressure sensor device is rapidly pressed several times, different page turn signals may be generated. For example, when the pressure sensor device is pressed one time in three seconds, an operating signal for turning to the next page is generated, and when the sensor device is rapidly pressed two times in three seconds, an operating signal for turning to the previous page is generated.

Alternatively in another embodiment, a previous page turn button and a next page turn button are provided. When the previous page turn button is pressed with the foot, the related previous page turn control circuit in the simplified processor transmits the previous page turn signal (wherein, the transmission is done through wireless communication module); likewise, when the next page turn button is pressed with the foot, the related next page turn control circuit in the simplified processor transmits the next page turn signal. Certainly, after the musical scores are arranged, the pages may generally be turned in sequence. Thus, only one next page turn button is provided and only the next page turn control circuit is provided in the simplified processor, the object of the present invention is likewise achieved in this single button embodiment.

In order to make the electronic musical score display device according to the present invention easily portable, the electronic paper forms the display part of the electronic display panel 10 (so that the display portion of the electronic display panel 10 can be rolled up) and the manipulator 20 is made to set on the outer surface of the cylindrical storage unit 12 where the electronic paper is stored, making the whole electronic musical score device smaller and easy to transport and to store.

With reference to FIG. 2, the electronic paper may be rolled as a tape measure and stored in the cylindrical storage unit 12. After storage, the half-tube shells 14 and 15 are folded in form of a tube and cover the cylindrical storage unit 12. The half-tube shells 14 and 15 are respectively provided with notches 142 and 152, and in the condition of storage (storage mode), the notches 142 and 152 correspondingly form into a long hollow-out area that exactly exposes the long transparent area (see FIG. 1 component 16) on the surface of cylindrical storage unit 12, which not only enhances the good look at the time of storage but also allow the user to determine whether the power in the cylindrical storage unit 12 is off at the time of storage for power saving or not.

Furthermore, the power supply is generally a battery, and a power switch may be added to cut off power to the manipulator when not working in order to achieve power saving and energy conservation.

A status indicating lamp may be provided between the upper layer 21 and the lower layer 22. The status indicating lamp transmits the rays of light out of the transparent area 24, indicating whether the manipulator 20 is operating or not. In another word, the status indicating lamp indicates the operating status of manipulator 20.

Figure 3:
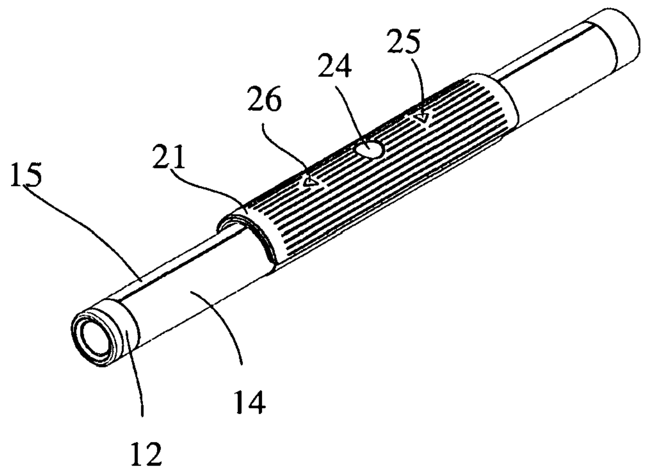
FIG. 3 is a schematic view illustrating the electronic musical score display device in the first embodiment where a manipulator is further stored after an electronic panel is stored.

Particularly, in the present embodiment, the manipulator 20 has the shape of half-tube, in which a support cushion 23 made of rubber is connected to two cylindrical fringes. When the manipulator 20 is operating, the support cushion 23 (which is made by rubber) will contact the ground surface to prevent the manipulator 20 from slipping, by providing additional grip. The manipulator 20 and the support cushion 23 are combined and formed into a tube that may be set around the outer surface of cylindrical storage unit 12 where the electronic display panel is stored. The electronic musical score display device in the condition of storage (storage mode) is shown in FIG. 3.

Figure 4:
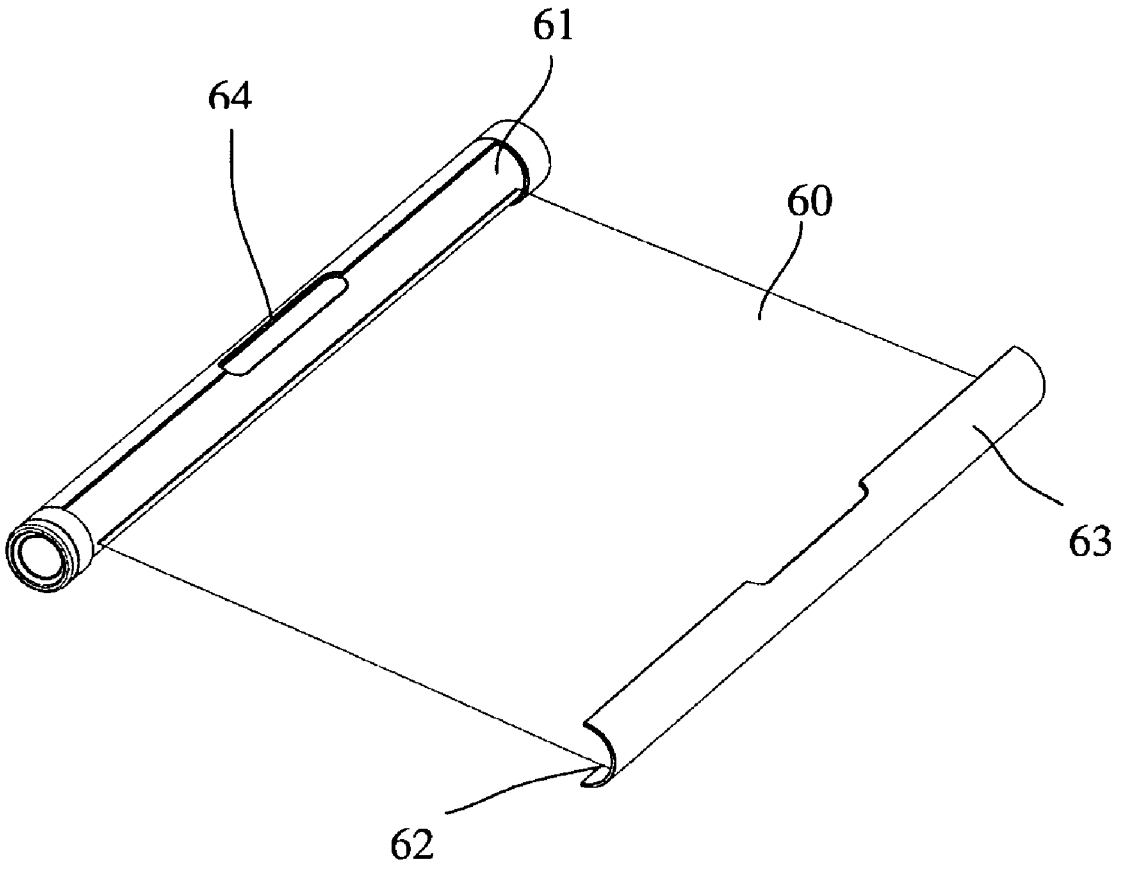
FIG. 4 is a schematic view illustrating the electronic musical score display device in a second embodiment where the electronic display panel is partially unfolded and partially stored.

With reference to FIG. 4 as a schematic view illustrating the electronic musical score display device in a second embodiment, the electronic display panel is partially unfolded and partially stored. In the second embodiment, the electronic display panel 60 likewise has an electronic paper on one end that is fixed to the cylindrical storage unit 61 and the other end 62 is connected to an inner wall of the half-tube shell 63. When the electronic paper (the display part of the electronic display panel 60) is pulled, the half-tube shell 63 is unfolded from the storage unit 61 and thus may also serve as the fixture (i.e. component 14 of FIG. 1) that makes the electronic paper to be securely unfolded. Relatively, at the time of storage, the half-tube shell 63 is likewise fixed to the outer surface of cylindrical storage unit 61 (i.e. component 15 of FIG. 1). The long transparent area 64 is also resides in the cylindrical storage unit 61 to serve as a display window for the status indicating lamp provided in the cylindrical storage unit 61. Other crucial parts in the electronic musical score display device in the second embodiment are the same as those in the first embodiment.

Many changes and modifications in the above-described embodiment of the invention can, of course, be carried out without departing from the scope thereof. For example, the cylindrical storage unit for the electronic paper may have another shape, such as a rectangular rod, a round box, or a square box, and the corresponding manipulator is also designed in a shape corresponding to the shape of the storage unit, and may thus be set around the outer surface of storage unit.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic musical score display device, comprising:
- an electronic display panel displaying at least one page of musical score data;
- a manipulator, operated by a pressure contact from a foot of a human operator, configured to begin a page turning process by transmitting a page turn signal through a wireless communication;
- a microprocessor configured to receive the page turn signal for turning a page and control divided pages of the musical score data shown on the electronic display panel; and
- a cylindrical storage unit having a main body and two half-tubular shells, for storing the electronic display panel;
- wherein when the electronic display panel is unfolded in an operating mode the main body of the cylindrical storage unit lies in a center of the electronic display panel with the half-tubular shells respectively located at left and right sides of the electronic display panel and serving as fixtures for securing the left side and the right side of the electronic display panel at predetermined positions.

2. The electronic musical score display device according to claim 1, wherein the electronic display panel is folded in a storage mode in which the two half-tubular shells substantially connect with each other and the manipulator, along with a support cushion connecting cylindrical fringes of the cylindrical storage unit are adapted to set around an outer surface of the cylindrical storage unit.

3. The electronic musical score display device according to claim 1, wherein the electronic display panel is an electronic paper.

4. An electronic musical score display device, comprising:
- an electronic display panel displaying at least one page of musical score data;
- a manipulator, operated by a pressure contact from a foot of a human operator, configured to begin a page turning process by transmitting a page turn signal through a wireless communication;
- a microprocessor configured to receive the page turn signal for turning a page and control the divided pages of the musical score data shown on the electronic display panel; and
- a storage unit having a main body and two half-tubular shells, for storing the electronic display panel;
- wherein when the electronic display panel is unfolded in an operating mode the main body of the storage unit lies in a center of the electronic display panel with the half-tubular shells respectively located at left and right sides of the electronic display panel and serving as fixtures for securing the left side and the right side of the electronic display panel at predetermined positions, and the electronic display panel is folded into the storage unit in a storage mode in which the half-tubular shells substantially connect with each other and the manipulator along with a supporting cushion are adapted to set around an outer surface of the storage unit.

5. The electronic musical score display device according to claim 4, wherein the electronic display panel is an electronic paper.

6. An electronic musical score display device, comprising:
- an electronic display panel displaying at least one page of musical score data;
- a manipulator, operated by a pressure contact from a foot of a human operator, configured to begin a page turning process by transmitting a page turn signal through a wireless communication;
- a microprocessor configured to receive the page turn signal for turning a page and control the divided pages of the musical score data shown on the electronic display panel; and
- a storage unit having a main body and a half-tubular shell, for storing the electronic display panel;
- wherein when the electronic display panel is in an operating mode one side of the electronic display panel connects to the main body of the storage unit with the other side of the electronic display panel connects to the half-tubular shell wherein the main body of the storage unit and the half-tubular shell serves as fixtures for securing the electronic display panel at predetermined positions, and the electronic display panel is in a storage mode in which the main body of the storage unit and the half-tubular shell connect to each other and the manipulator along with a supporting cushion are adapted to set around an outer surface of the storage unit.

7. The electronic musical score display device according to claim 6, wherein the electronic display panel is an electronic paper.

* * * * *